UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF ALUMINOUS CAKE.

SPECIFICATION forming part of Letters Patent No. 243,635, dated June 28, 1881.

Application filed December 7, 1880. (No specimens.)

*To all whom it may concern:*

Be it known that I, CONRAD SEMPER, of Philadelphia, Pennsylvania, have invented an Improvement in the Manufacture of Aluminous Cake, or Sulphate of Alumina, of which the following is a description sufficient to enable those skilled in the art to which my invention appertains to understand and practice the same.

The object of my invention is to produce a white aluminous cake or sulphate of alumina, for paper-makers' use from a ferruginous aluminous material—such as bauxite, alum, clay, &c., by reducing the ferric salts in said material to ferrous oxide salts, and at the same time neutralizing any free acid which may be present. Heretofore this has been accomplished by F. Laur, by the addition of zinc to a solution of ferruginous sulphate of alumina.

I have discovered that by adding zinc to a pasty or semi-fused mass of sulphate of alumina the action of reduction of the peroxide of iron to a colorless protoxide of iron is much more rapidly and cheaply effected. This is especially true when the zinc is introduced to the semi-fluid sulphate of alumina in a finely divided state. Metallic zinc may be employed in a state of fine subdivision, and I have found that the waste product produced in zinc-smelting processes and known as "zinc-dust" is a cheap and efficacious material for the purpose.

In my process I do not confine myself to the introduction of the metallic zinc or zinc-dust at any specified time, but I prefer to add it to the sulphate of alumina, formed by sulphuric acid and bauxite or other ferruginous aluminous material at or about the time the reaction of the sulphuric acid upon the bauxite or aluminous clay ceases or is about to cease, with the result that the salts of peroxide of iron therein are rapidly and thoroughly reduced to a colorless protoxide of iron, and form part of the aluminous product. The resulting colorless aluminous sulphate may be formed into an aluminous cake in the usual manner, or the silica and zinc-dust impurities may be allowed to settle out, and sulphate of alumina free from these substances be produced.

Having thus described my invention, I claim and desire to secure by Letters Patent of the United States—

The herein-described process of manufacturing a white aluminous cake from ferruginous aluminous sulphate, by treating the aluminous sulphate in a semi-fused condition with zinc or zinc-dust, substantially as herein set forth.

In testimony whereof I have hereunto signed my name this 1st day of December, A. D. 1880.

CONRAD SEMPER.

In presence of—
W. C. STRAWBRIDGE,
J. BONSALL TAYLOR.